United States Patent
Jung et al.

(10) Patent No.: US 11,072,262 B2
(45) Date of Patent: Jul. 27, 2021

(54) PORTABLE CAR SEAT

(71) Applicant: DONG-IN ENTECH CO., LTD., Gyeonggi-do (KR)

(72) Inventors: In Soo Jung, Gyeonggi-do (KR); Kurtis Sakai, South Pasadena, CA (US); In Seok Choi, Busan (KR)

(73) Assignee: DONG-IN ENTECH CO., LTD., Gyeonggi-do (KR)

( * ) Notice: Subject to any disclaimer, the term of this patent is extended or adjusted under 35 U.S.C. 154(b) by 0 days.

(21) Appl. No.: 16/511,643

(22) Filed: Jul. 15, 2019

(65) Prior Publication Data
US 2020/0017004 A1     Jan. 16, 2020

Related U.S. Application Data

(60) Provisional application No. 62/698,449, filed on Jul. 16, 2018.

(30) Foreign Application Priority Data

Oct. 15, 2018    (KR) .................. 10-2018-0122830

(51) Int. Cl.
| | |
|---|---|
| *B60N 2/28* | (2006.01) |
| *A61G 1/017* | (2006.01) |
| *A47L 15/00* | (2006.01) |
| *A47C 4/04* | (2006.01) |

(52) U.S. Cl.
CPC ......... *B60N 2/2881* (2013.01); *B60N 2/2851* (2013.01); *B60N 2/2884* (2013.01); *B60N 2/2887* (2013.01); *A47C 4/04* (2013.01); *A47L 15/006* (2013.01); *A61G 1/017* (2013.01); *B60N 2002/2896* (2013.01)

(58) Field of Classification Search
CPC ................ B60N 2/2881; B60N 2/2851; B60N 2/2884; B60N 2/2887; B60N 2/28; B60N 2/26; B60N 2/2809; B60N 2/2812; B60N 2002/2896; A61G 1/017; A61G 1/013; A61G 1/04; A47D 15/006; A47C 4/04
See application file for complete search history.

(56) References Cited

U.S. PATENT DOCUMENTS

| | | | | |
|---|---|---|---|---|
| 3,223,447 | A * | 12/1965 | Terracini ................ | B60N 2/882 297/397 |
| 6,722,742 | B2 * | 4/2004 | Potes ..................... | A47C 7/282 297/452.56 |
| 7,758,120 | B2 * | 7/2010 | Zink .................... | B60N 2/2866 297/250.1 |
| 7,857,385 | B2 * | 12/2010 | Zink .................... | B60N 2/2851 297/256 |
| 8,038,212 | B2 * | 10/2011 | Vickers ................ | B60N 2/2881 297/250.1 |

(Continued)

FOREIGN PATENT DOCUMENTS

| | | |
|---|---|---|
| JP | 07-101276 | 4/1995 |
| KR | 20-1995-0017850 | 7/1995 |

(Continued)

OTHER PUBLICATIONS

International Search Report Issued by PCT International Application No. PCT/KR2019/008659 dated Oct. 16, 2019.

*Primary Examiner* — Syed A Islam
(74) *Attorney, Agent, or Firm* — IP & T Group LLP

(57) ABSTRACT

The present disclosure relates to a portable car seat comprising a backrest part, and a seat part rotating to be positioned at a front side or a rear side of the backrest part, wherein the backrest part includes an aluminum frame.

12 Claims, 13 Drawing Sheets

(56) References Cited

U.S. PATENT DOCUMENTS

| | | | | |
|---|---|---|---|---|
| 8,152,236 B1 * | 4/2012 | Romero | ............... | A47D 15/006 |
| | | | | 297/230.11 |
| 8,360,521 B2 * | 1/2013 | Macliver | .............. | B60N 2/2812 |
| | | | | 297/250.1 |
| 8,827,364 B2 * | 9/2014 | Banghart | ............... | B60N 2/286 |
| | | | | 297/253 |
| 10,315,537 B2 * | 6/2019 | Renaudin | ............. | B60N 2/2872 |
| 2016/0082865 A1 * | 3/2016 | Zhou | ................... | B60N 2/2821 |
| | | | | 297/216.11 |
| 2018/0022241 A1 | 1/2018 | Jewkes | | |
| 2018/0111516 A1 | 4/2018 | Lin | | |

FOREIGN PATENT DOCUMENTS

| | | | | |
|---|---|---|---|---|
| KR | 20-0359741 | 8/2004 | | |
| KR | 10-0988588 | 10/2010 | | |
| KR | 10-0995965 | 11/2010 | | |
| KR | 10-1000970 | 12/2010 | | |
| KR | 10-1251170 | 4/2013 | | |
| KR | 10-1251188 | 4/2013 | | |
| KR | 10-2014-0011173 | 1/2014 | | |
| KR | 10-1615046 | 4/2016 | | |
| KR | 10-1627451 | 6/2016 | | |
| KR | 10-1642604 | 7/2016 | | |
| KR | 10-1689710 | 12/2016 | | |
| KR | 10-1713245 | 3/2017 | | |
| KR | 20-2017-0001117 | 3/2017 | | |
| KR | 10-1788719 | 10/2017 | | |
| KR | 10-2018-0050663 | 5/2018 | | |
| KR | 10-1861847 | 5/2018 | | |
| KR | 10-1866149 | 6/2018 | | |
| KR | 10-1867980 | 6/2018 | | |
| KR | 10-2018-0080458 | 7/2018 | | |
| WO | 2017/131282 | 8/2017 | | |
| WO | WO-2017131282 A1 * | 8/2017 | ............ | B60R 22/10 |

* cited by examiner

PORTABLE CAR SEAT

CROSS-REFERENCE TO RELATED APPLICATIONS

The present application claims benefit under 35 U.S.C. § 119(e) of U.S. Provisional Application No. 62/698,449, filed on Jul. 16, 2018 in the United States Patent and Trademark Office, and benefit under 35 U.S.C. § 119(a) of Korean patent application number 10-2018-0122830, filed on Oct. 15, 2018 in the Korean Intellectual Property Office, the entire disclosures of which are incorporated by reference herein.

BACKGROUND

Field of Invention

Various embodiments of the invention relate generally to a portable car seat.

Description of Related Art

In general, passengers in various types of vehicles, such as cars, wear their seat belts for safety. However, since most seat belts and safety devices attached to vehicles are designed for adults, infants or children accompanied by a driver are likely to suffer more severe injuries in car accidents by crashes or rear-end collisions.

Infants or children who are smaller than adults cannot wear seat belts properly; thus, they are easily exposed to greater danger. If they are directly belted up, the abdomen and the neck (around which a seat belt crosses) are vulnerable to injury since seat belts are not suitable for their physical conditions.

Recently, therefore, separate infant safety seats, the so-called infant car seats have been installed in vehicles. A vehicle can be driven with an infant sitting on an infant car seat.

The maximum function of infant car seats is to absorb impact, generated at the time of a car collision, as much as possible and dissipate it before the impact is transmitted to a kid. Obviously, infant car seats save lives. More specifically, the number of accidents resulting in serious injury or death when infant car sears are in use is less than 40% as compared to when not in use, infant car seat use accounts for only one third (⅓) of the total number of casualties, and serious injury or death out of the total casualties reaches only 1.17%.

In accordance with the national regulations such as the Road Traffic Act, for infants or children's safety, child restraints are required to be mounted into vehicles when an infant or a child rides in a vehicle. However, in reality, people do not comply with these regulations.

Since a system intended to safely seat an infant in a vehicle is not currently installed, a car owner should purchase and install an infant car seat in the vehicle. In addition, even if a driver buys it, the driver is likely to end up with giving up installing and using the infant car seat since it is not convenient to carry the infant car seat due to its large weight and size.

Therefore, to secure the safety of infants or children and save their lives, research and development have been actively conducted to increase infant car seat use and improve safety.

SUMMARY

Various embodiments are directed to a portable car seat securing safety of an infant in a vehicle and facilitating portability.

A portable car seat may include a backrest part, and a seat part rotating to be positioned at a front side or a rear side of the backrest part, wherein the backrest part includes an aluminum frame.

The portable car seat may further include a backrest-cushion part provided at the front side of the backrest part and having a mesh structure.

An upper end of the backrest-cushion part may be placed over an upper end of the backrest part.

The portable car seat may further include car belt guide parts provided on left and right sides of the aluminum frame of the backrest part.

Through holes pray be formed in both side surfaces of the aluminum frame of the backrest part so that an Isofix latch belt passes through the through holes.

Elastic pins may be provided on lower ends of both sides of the aluminum frame so that Isofix buckles rest on the elastic pins.

A first hole may be formed in a top surface of the aluminum frame of the backrest part so that an infant securing belt passes through the first hole.

A second hole may be formed in a top surface of the aluminum frame of the backrest part so that a hanger belt passes through the second hole so as to be fixed to a rear surface of a seat of a vehicle.

A back cover may be provided on a rear surface of the aluminum frame of the backrest part to define a receiving space in which the hanger belt is received.

The portable car seat may further include a headrest part provided above the backrest part, and a height adjustment part lifting or lowering the headrest part with respect to the backrest part.

The headrest part may include a head support, a curved wire extending from an upper end of the height adjustment part toward left, right and front sides, then toward a bottom by a predetermined height, and then toward central and rear sides, and a headrest cover having a mesh structure and covering the curved wire.

The headrest part may further include a cover loop allowing the head cover to be caught.

The portable car seat may further include a fixation loop allowing the seat part to hang on an upper end of the backrest part when the seat part is folded upon the rear side of the backrest part.

The fixation loop may be caught on a push portion of the height adjustment part lifting and lowering the headrest part.

The portable car seat may further include a hook portion hooked on a lower end of the backrest part when the seat part is placed at the front side of the backrest part.

One end of the hook part may be rotatably coupled to the seat part and another end of the hook part is caught by a stopper provided in a width direction on the lower end of the backrest part.

The portable car seat may further include a rotation part rotatably connecting the seat part to the backrest part.

The rotation part may rotate about the backrest part and switch between a portable state in which the seat part is disposed to face a rear surface of the backrest part and a seatable state in which the seat part is inclined with respect to a front surface of the backrest part.

The backrest part may include a reinforced frame provided in a width direction on the aluminum frame.

The aluminum frame may include a rotation origin formed at a back side of a lower end thereof to allow the seat part to rotate around, and a rotation preventing point formed at a front side of the lower end thereof and being in contact with the seat of the vehicle to prevent the backrest part from rotating toward a space in which an infant sits, and the rotation preventing point may be positioned ahead of the rotation origin.

The seat part may include a seat frame, and a seat cover enclosing the seat frame.

The rotation part may include a rotation connection part rotating the seat part with respect to the backrest part, and a rotation prevention part restricting rotation of the seat part with respect to the backrest part.

The rotation connection part may include a rotation frame provided in the width direction at the lower end of the backrest frame and serving as a rotating shaft of the seat part, and a rotation coupling unit rotatably provided on the rotation frame and connected to an end portion of the seat frame.

The rotation prevention part may include a stopper provided in the width direction at the lower end of the backrest frame, and a stopper facing part provided in the width direction at a position facing the stopper when the seat part rotates, and preventing rotation of the seat part toward the space in which the infant sits.

The portable car seat may further include an infant securing belt including a shoulder cushion part and a latch buckle and allowing an infant to be indirectly secured to a vehicle.

DETAILED DESCRIPTION

Figure 1:
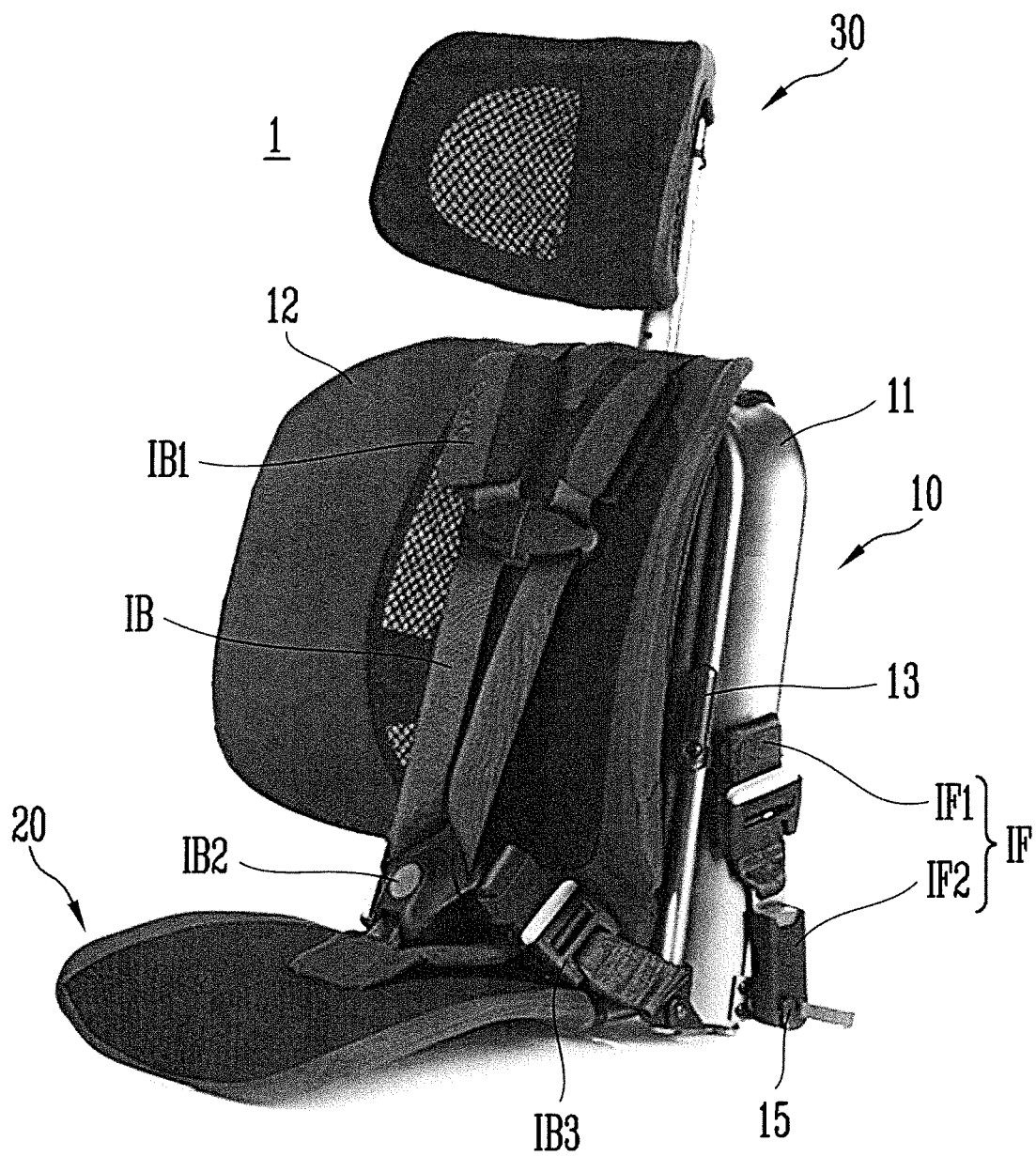
FIG. 1 is a perspective view illustrating a portable car seat according to an embodiment of the present disclosure.

The present invention, the merits thereof, and the objectives accomplished by the implementation of the present invention will be clarified through the Detailed Description of Preferred Embodiments and the Claims with reference to the attached drawings. Like reference numerals in the drawings denote like elements. In the following description, it should be noted that only a portion required to understand the operation in accordance with the present disclosure will be described, and the description of the remaining portion will be omitted not to obscure the gist of the present disclosure.

Hereinafter, embodiments in accordance with the present disclosure will be described in detail with reference to the accompanying drawings.

Figure 2:
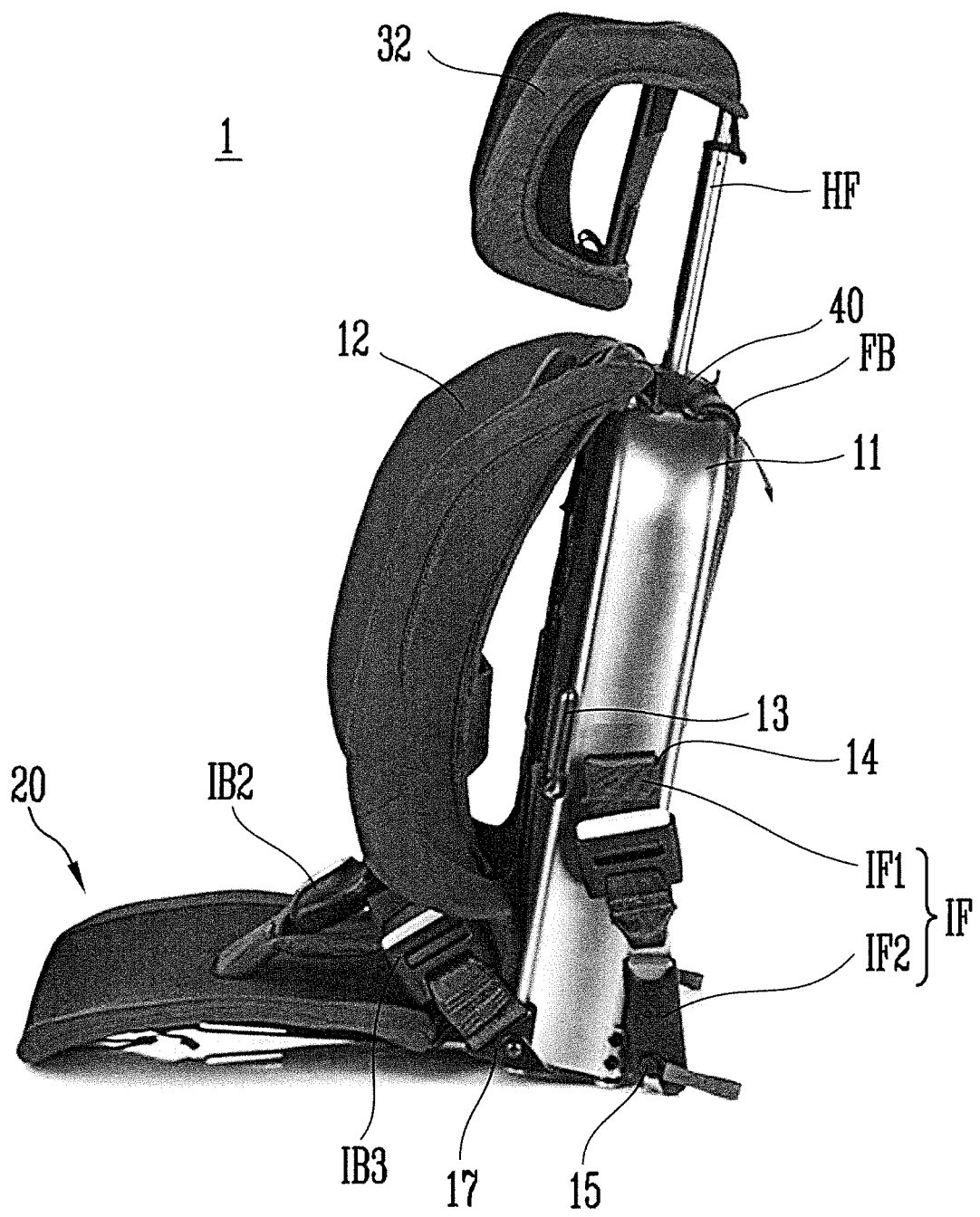
FIG. 2 is a side view illustrating a portable car seat according to an embodiment of the present disclosure.
Figure 3:
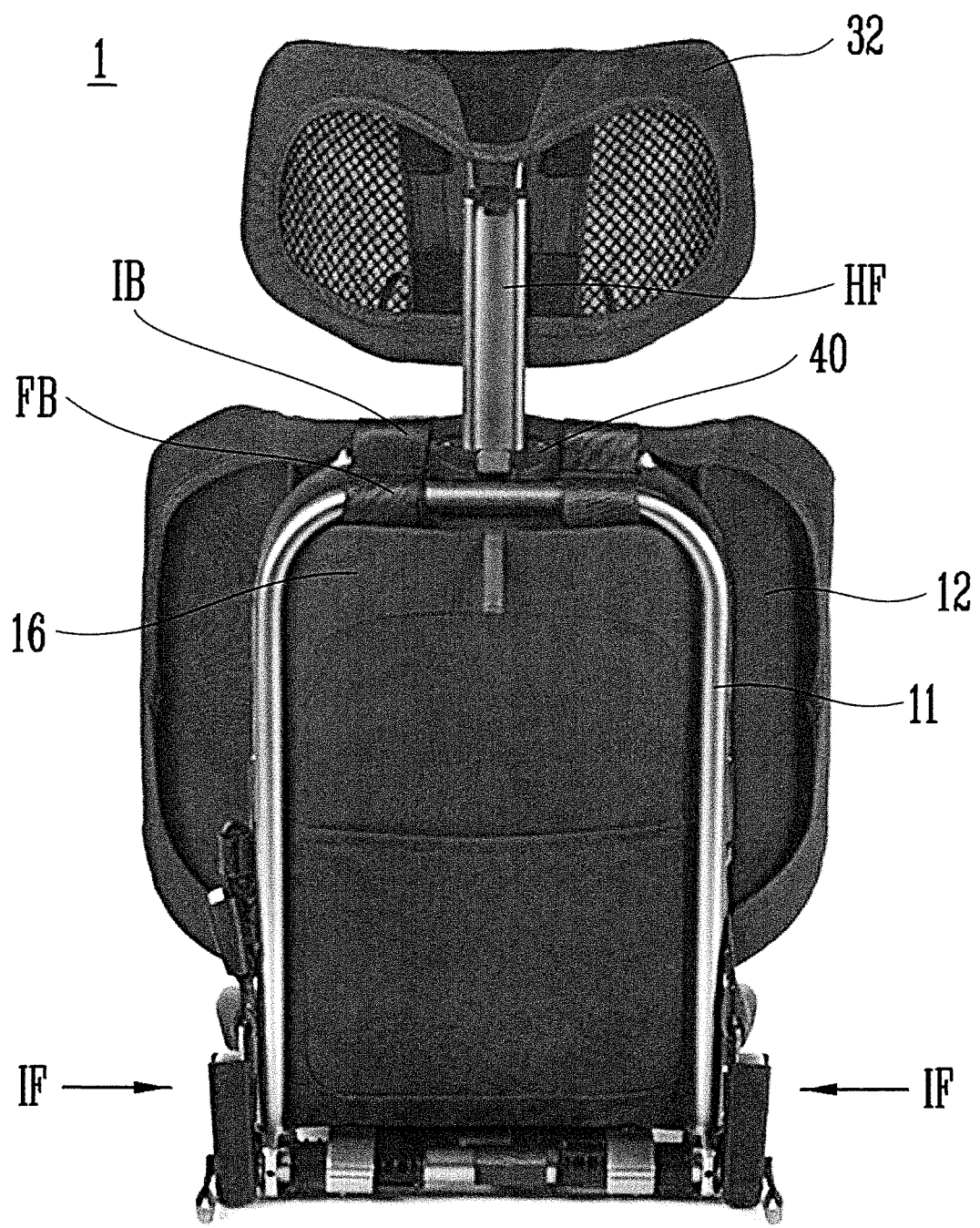
FIG. 3 is a rear view illustrating a portable car seat according to an embodiment of the present disclosure.
Figure 4:
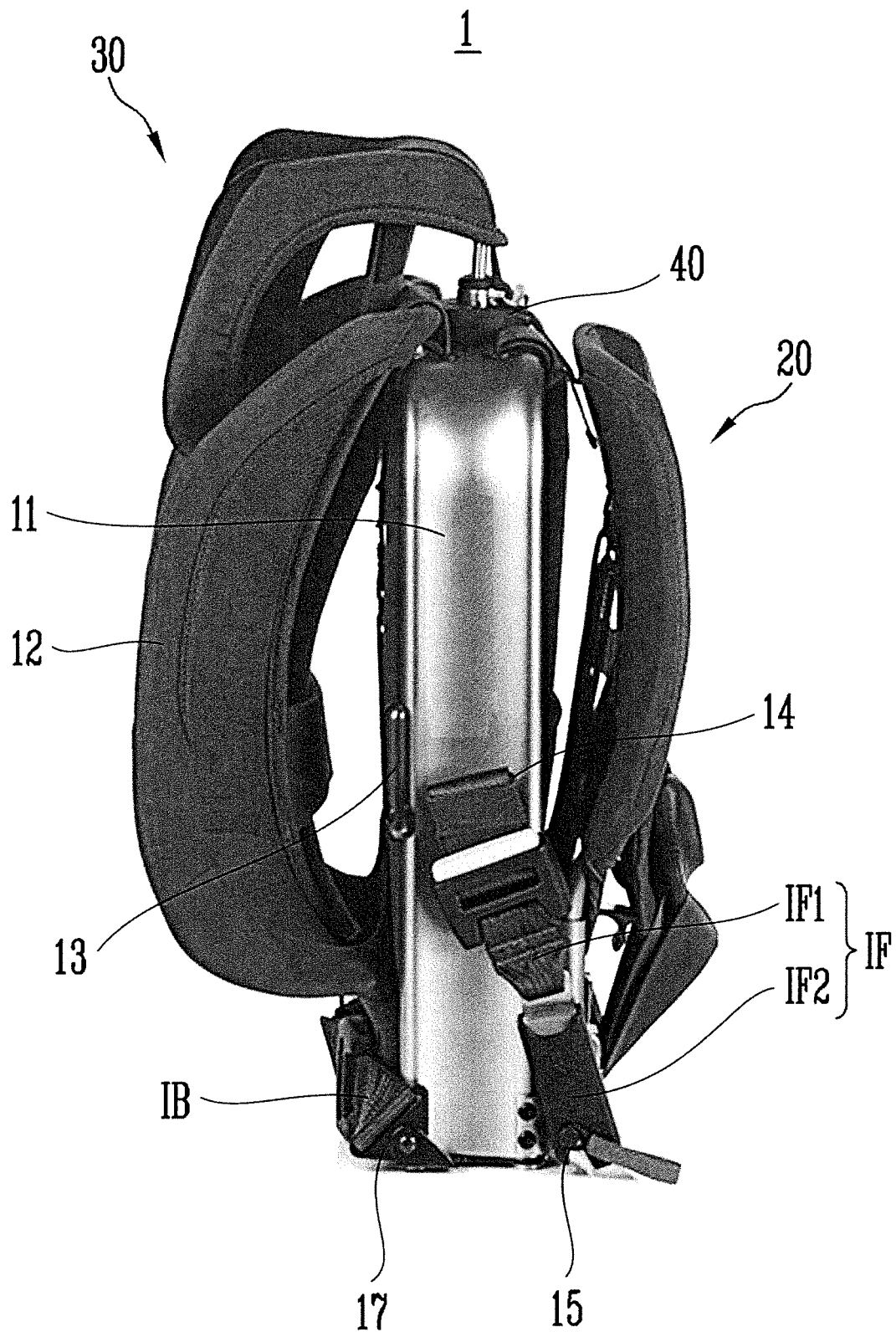
FIG. 4 is a side view illustrating operations of a portable car seat according to an embodiment of the present disclosure.
Figure 5:
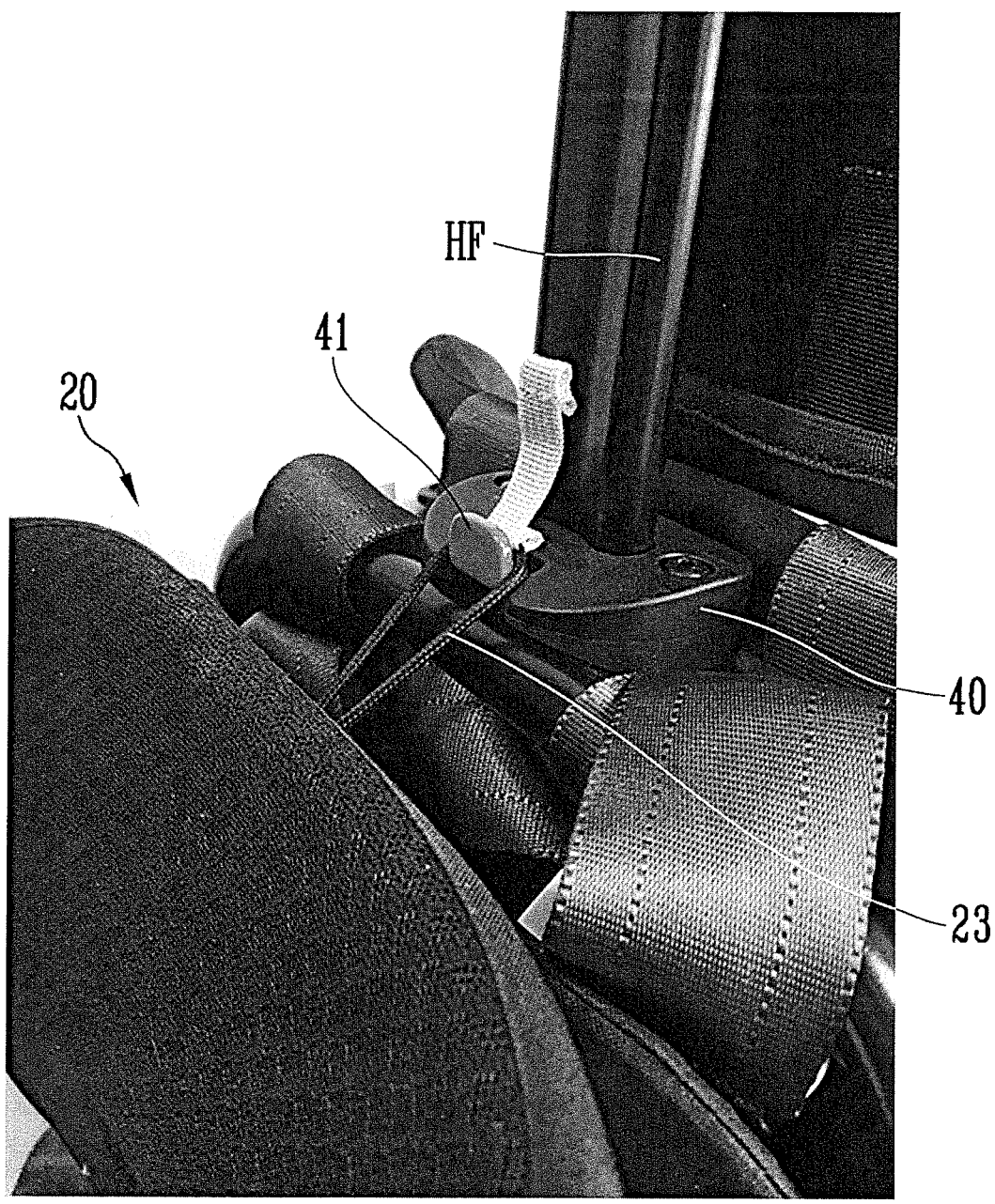
FIGS. 5 to 7 are partial enlarged views of a portable car seat according to an embodiment of the present disclosure.
Figure 6:
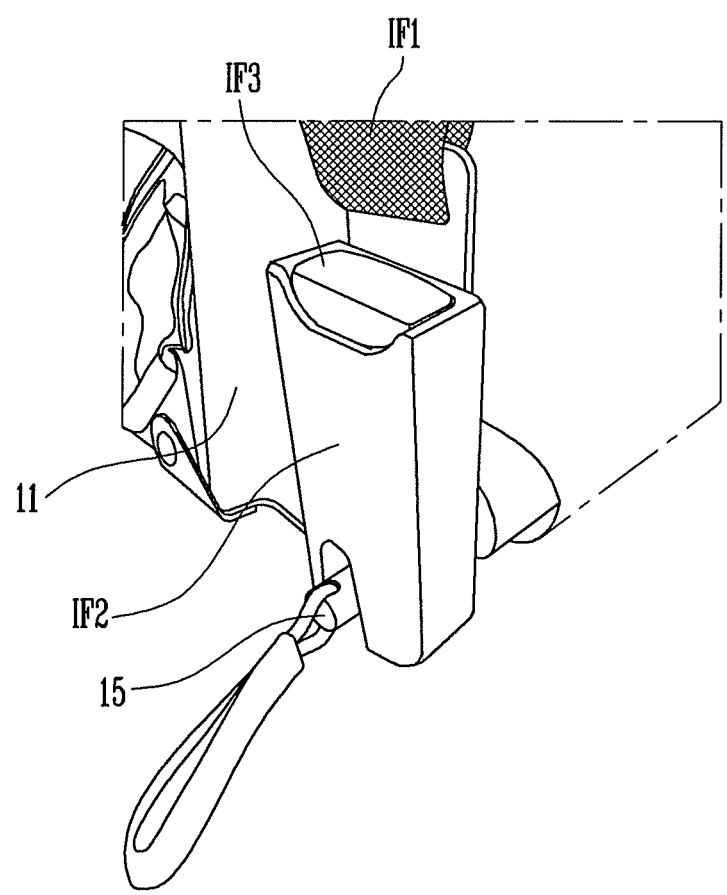
Figure 7:
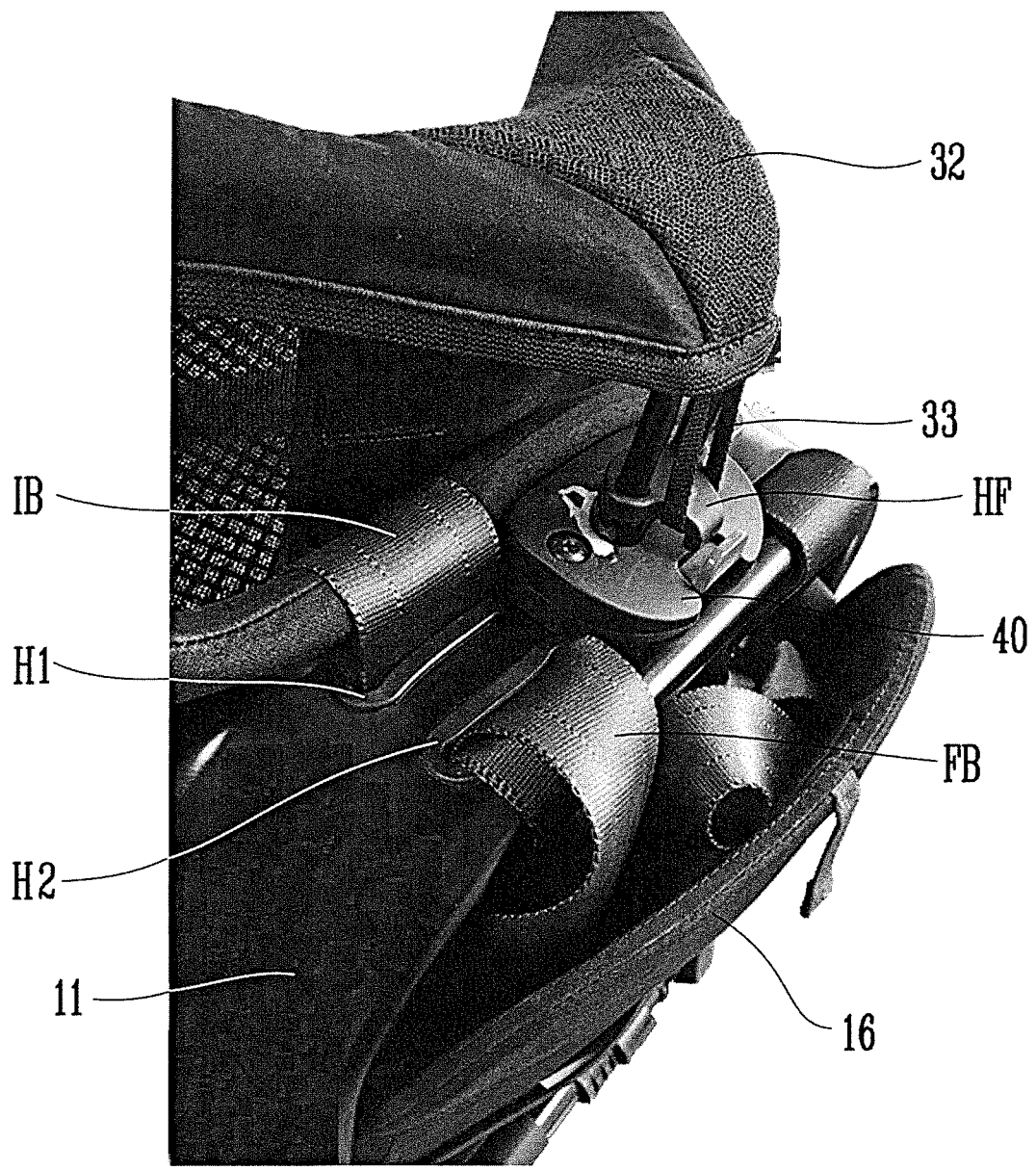
Figure 8:
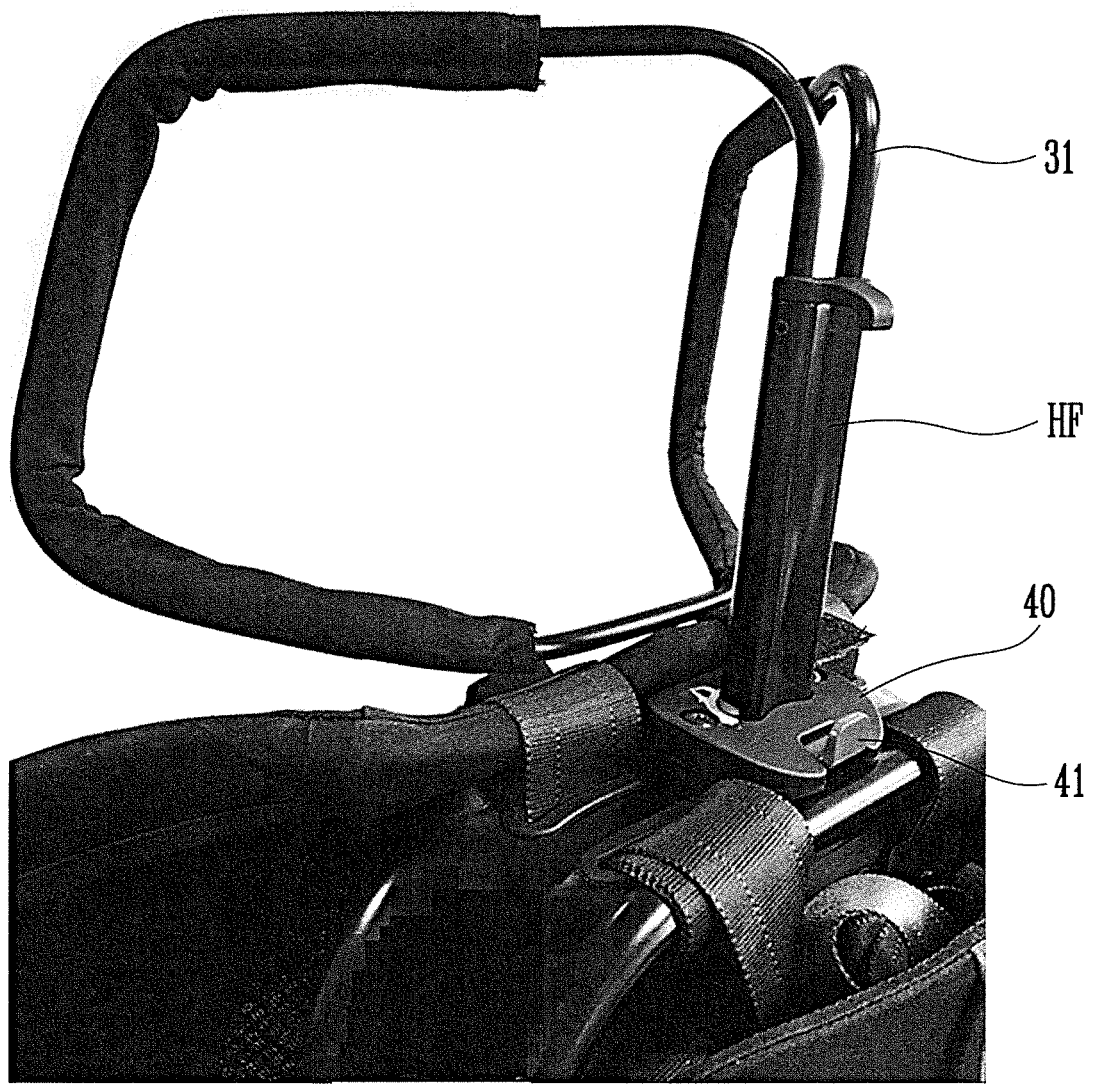
FIGS. 8 and 9 are views illustrating a headrest part of a portable car seat according to an embodiment of the present disclosure.
Figure 9:
Figure 10:
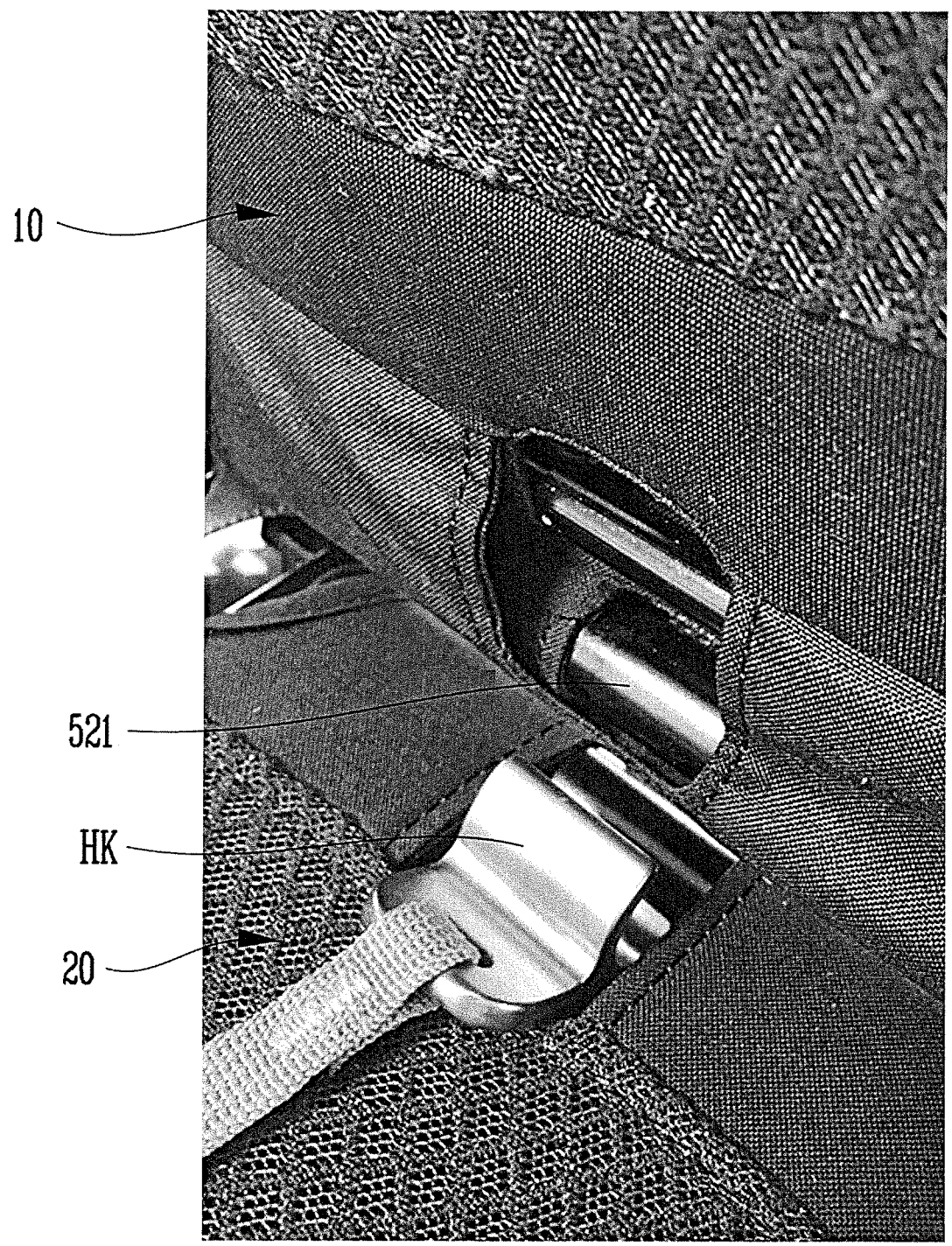
FIGS. 10 and 11 are views illustrating a hook part of a portable car seat according to an embodiment of the present disclosure.
Figure 11:
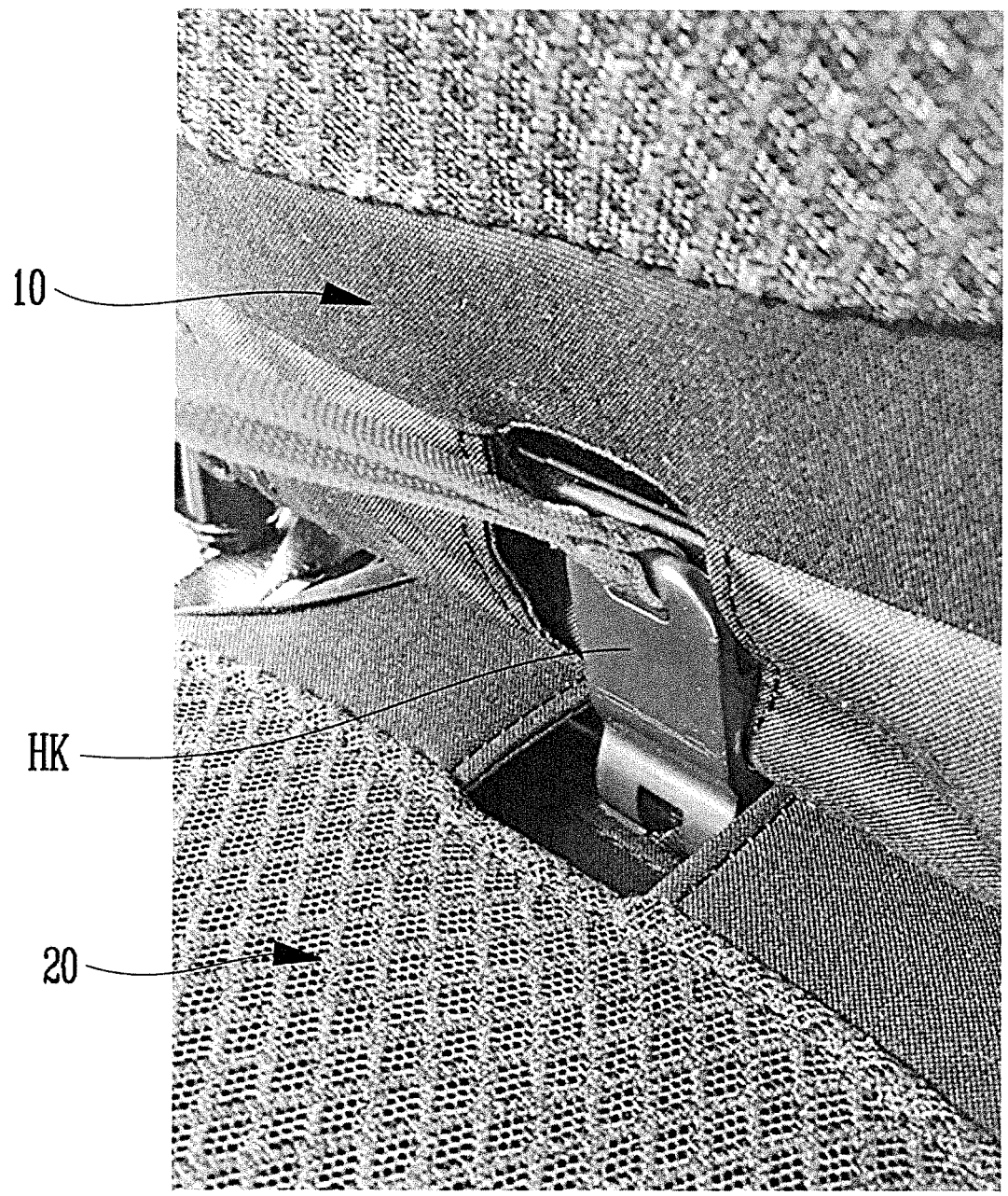
Figure 12:
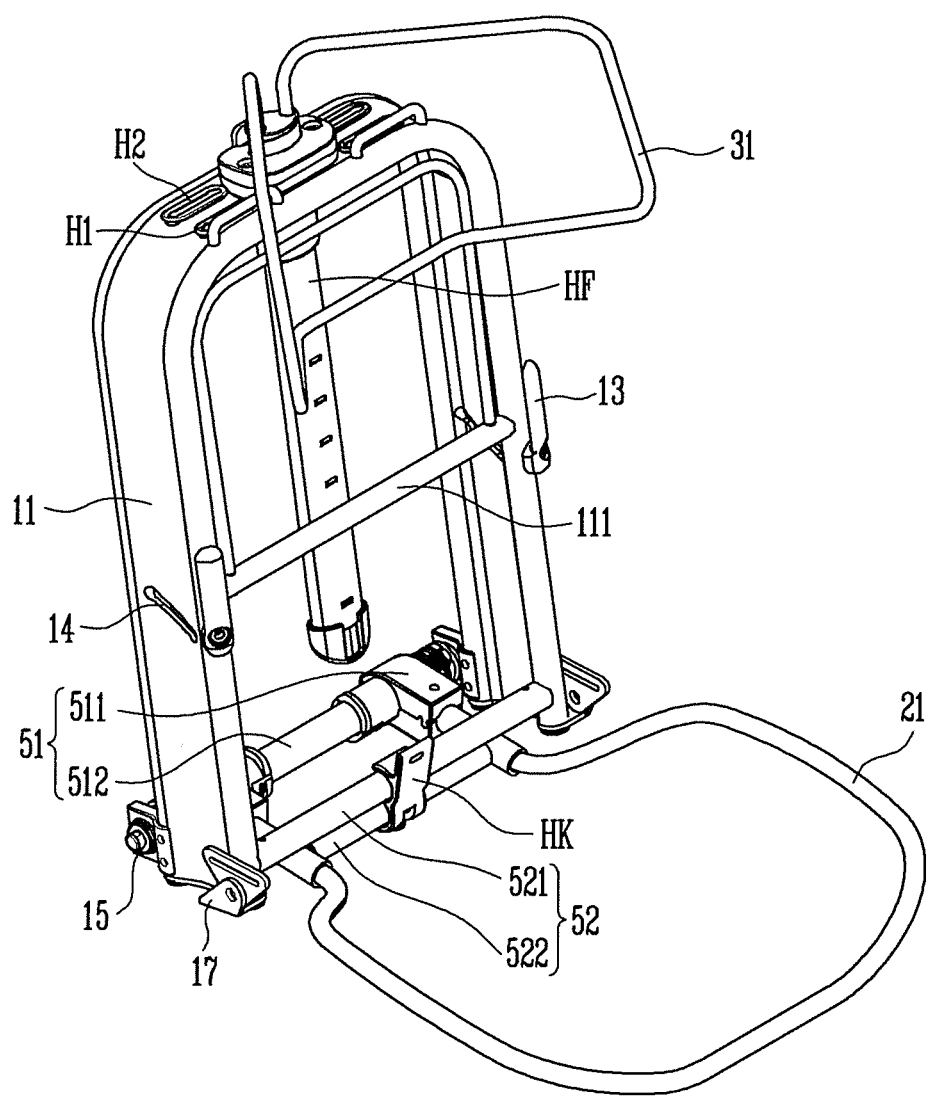
FIG. 12 is a perspective view illustrating a frame of a portable car seat according to an embodiment of the present disclosure.
Figure 13A:
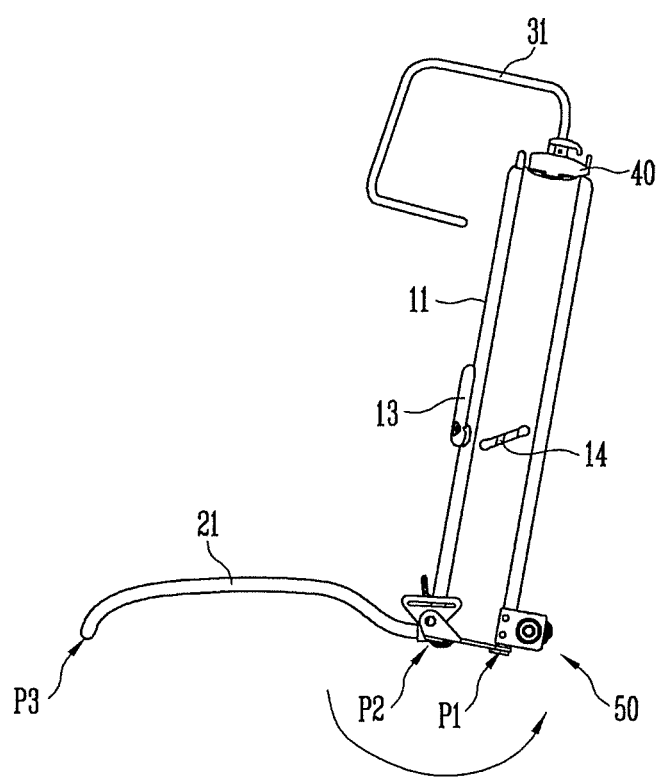
FIGS. 13A and 13B are side views illustrating operations of a portable car seat according to an embodiment of the present disclosure.
Figure 13B:
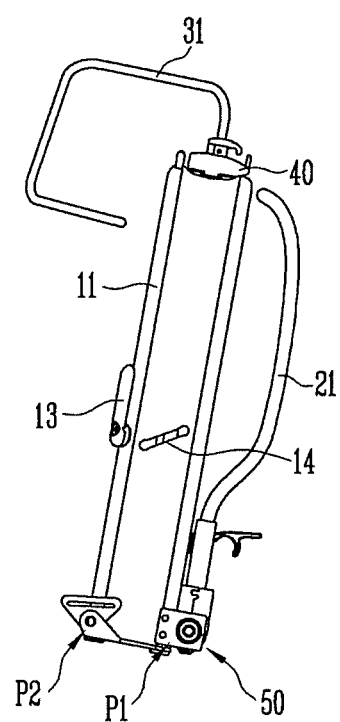

FIG. 1 is a perspective view illustrating a portable car seat according to an embodiment of the present disclosure. FIG. 2 is a side view illustrating a portable car seat according to an embodiment of the present disclosure. FIG. 3 is a rear view illustrating a portable car seat according to an embodiment of the present disclosure. FIG. 4 is a side view illustrating operations of a portable car seat according to an embodiment of the present disclosure. FIGS. 5 to 7 are partial enlarged views of a portable car seat according to an embodiment of the present disclosure. FIGS. 8 and 9 are views illustrating a headrest part of a portable car seat according to an embodiment of the present disclosure. FIGS. 10 and 11 are views illustrating a hook part of a portable car seat according to an embodiment of the present disclosure. FIG. 12 is a perspective view illustrating a frame of a portable car seat according to an embodiment of the present disclosure. FIGS. 13A and 13B are side views illustrating operations of a portable car seat according to an embodiment of the present disclosure.

As shown in FIGS. 1 to 9, a portable car seat according to an embodiment of the present disclosure may include a backrest part 10, a seat part 20 rotatably provided at a front side or a rear side of the backrest part 10, a headrest part 30 provided above the backrest part 10, a height adjustment part 40 lifting or lowering the headrest part 30, and a rotation part 50 rotatably connecting the backrest part 10 and the seat part 20.

In addition, the portable car seat 1 according to an embodiment of the present disclosure may further include an Isofix system IF and a hanger belt FB for fixing the portable car seat 1 to a seat of a vehicle and an infant securing belt IB for securing an infant in the portable car seat 1.

The above components will be described below in more detail with reference to FIGS. 1 to 9.

Referring to FIGS. 1 to 4, the backrest part 10 may be positioned under the headrest part 30 and above the seat part 20 and support the back of an infant to face the spine when the infant sits on the seat part 20, so that the backrest part 10 may allow the infant to be entirely supported by the portable car seat 1. When the portable car seat 1 is installed in the vehicle, the backrest part 10 may be placed on the seat of the vehicle.

The backrest part 10 may include a frame 11 formed of an aluminum material (hereinafter, "aluminum frame 11") and a backrest-cushion part 12 in front of the aluminum frame 11.

The aluminum frame 11 may be formed of high strength aluminum alloys and have an inverted U shape. Front and rear surfaces of the aluminum frame 11 may be covered by a fabric cover. For example, the aluminum frame 11 may be formed of an aluminum alloy A6005 or A7001. However, the present disclosure is not limited thereto. The aluminum frame 11 may be formed of another metal in addition to aluminum. However, synthetic resins are not used to form the frame of the backrest part 10.

In a conventional car seat, a polystyrene foam member is coupled to a plastic frame, which is then enclosed by a cover. However, in a car seat according to an embodiment of the present disclosure, a metal frame is used to improve durability, and the car seat is collapsible to increase portability and protect an infant against impact for weight. In addition, since a polystyrene foam member is not used, the car seat according to an embodiment may contribute to environmental protection. Moreover, the polystyrene foam member is likely to break down. However, the car seat using the metal frame according to an embodiment may improve strength.

The backrest-cushion part 12 may be curved around the top, bottom, left and right edges to safely support the back of an infant. According to an embodiment of the present disclosure, the backrest-cushion part 12 may include a metallic wire covered with mesh. The mesh is washable by removing the mesh from the wire by separating a Velcro tape. The use of the mesh may improve ventilation.

The mesh may have any material and shape, including fabric or leather, as long as it can cover the wire. The mesh may be removed from the wire through any fastening means such as a snap fastener, a button and string tie closure, or the like in addition to the Velcro tape.

An upper end of the backrest-cushion part 12 may be placed over an upper end of the aluminum frame 11. In other words, an upper end of the wire may be placed over the upper end of the aluminum frame 11 so that the upper end of the backrest-cushion part 12 may not protrude from the aluminum frame 11 at a predetermined height or more. However, the upper end of the wire may be provided at a front side without passing over the upper end of the aluminum frame 11.

Though not shown in detail, the upper and lower ends of the backrest-cushion part 12 may be coupled to the aluminum frame 11. More specifically, the upper end of the backrest-cushion part 12 may have a loop caught by a Velcro tape provided on the cover, and the lower end thereof may be fixed to the cover by using a button. However, the present disclosure is not limited thereto.

Car belt guide parts 13 may be additionally provided on left and right sides of the aluminum frame 11. The car belt guide part 13 may be cantilever type guide arms.

In addition, through holes 14 may be formed at both side surfaces of the aluminum frame 11 so that an Isofix latch belt IF1 may pass therethrough. The Isofix latch belt IF1 may pass through the aluminum frame 11 in a horizontal direction. The through holes 14 may be obliquely formed in consideration of an angle at which the Isofix latch belt IF1 is coupled.

In addition, referring to a frame structure to be described below with reference to FIG. 12, at least one reinforced frame 111 may be formed in a width direction in the aluminum frame 11.

The infant securing belt IB may be connected from an upper side of the aluminum frame 11 to both lower ends thereof. Brackets 17 may be rotatably provided at connections to both lower ends of the aluminum frame 11. However, a rotation angle of the bracket 17 may be limited. Protrusions (no reference sign provided) may be formed on the aluminum frame 11 around the brackets 17 to limit angles of the brackets 17 so that portions of the brackets 17 which are connected to the infant securing belt IB face forward at all times. Thereby, the infant securing belt IB may be prevented from being stuck between the brackets 17 and the aluminum frame 11, or the infant securing belt IB from being twisted.

The infant securing belt IB may include a shoulder cushion part IB1, a latch buckle IB2 to which left and right shoulder belts and a waist belt are secured, and a left-and-right buckle IB3 securing the waist belt. The latch buckle IB2 and the left-and-right buckle IB3 may be slidably provided on the respective belts. According to an embodiment of the present disclosure, the infant securing belt IB is formed in a 3 point harness belt. However, the infant securing belt 1B with a 2 point or 5 point harness is also applicable.

The seat part 20 on which an infant sits may be positioned under the backrest part 10 so as to face the hips of the infant. When the portable car seat 1 is installed in a vehicle, the seat part 20 may be mounted on the seat of the vehicle. The seat part 20 may be curved to support the lower body of the infant. Therefore, when the infant sits in the portable car seat 1, the center of gravity may be located stably in the rear side.

As shown in FIG. 2, the backrest part 10 of the portable car seat 1 in the form of a chair in a plane view may be inclined backwards. The backrest-cushion part 12 of the backrest part 10 and the seat part 20 may have convex surfaces when viewed from the side and concave surfaces in a front view. A protruding height of the seat part 20 may be less than that of the backrest-cushion part 12.

To improve portability, the seat part 20 may be rotatably provided at a front side or a rear side of the backrest part 10. The seat part 20 may switch between a use position where the seat part 20 and the backrest part 10 form an L shape and a storage position where the seat part 20 is rotated down and back to lie over a rear surface of backrest part 10. However, at the time of storage, the seat part 20 may be positioned down the backrest part 10 instead of behind.

Referring to the frame structure to be described below with reference to FIG. 12, in the same manner as in the backrest-cushion part 12, the seat part 20 may be provided by covering the seat frame 21 with mesh, and the mesh may be washable by removing the mesh from the wire by separating a Velcro tape.

Referring to FIG. 5, according to an embodiment of the present disclosure, the portable car seat 1 may further include a fixation loop 23 which allows the seat part 20 to hang on the upper end of the backrest part 10 when the seat part 20 is rotated down and folded to face a rear surface of the backrest part 10. The fixation loop 23 may be caught on a push portion 41 of the height adjustment part 40 for lifting or lowering the headrest part 30. In other words, an end portion of the push portion 41 may protrude upward so that the fixation loop 23 may be caught thereon.

Referring to FIG. 6, elastic pins 15 may be provided at both lower ends of the aluminum frame 11 so that Isofix buckles IF2 may rest on the elastic pins 15. The Isofix system IF may be configured to secure the portable car seat 1 to the seat of the vehicle and may include the Isofix latch belt IF1 and the Isofix buckles IF2. As described above, the Isofix latch belt IF1 may pass through both side surfaces of the aluminum frame 11. The Isofix buckles IF2 may be provided at respective end portions of the Isofix latch belt IF1 and tightly fixed to an attachment in the seat of the vehicle. A buckle pressing portion IF3 may be provided at an end portion of each Isofix buckle IF2, so that securing may be released by a pressing operation.

The elastic pins 15 may be provided to allow the Isofix buckles IF2 to rest thereon when the portable car seat 1 is collapsed into the storage state, or when the portable car seat 1 is installed on the seat of the vehicle but Isofix attachments are not installed on the seat of the vehicle. When a user pulls the elastic pins 15 using a string and makes the Isofix buckles IF2 rest on the elastic pins 15, the Isofix buckles IF2 may be stably secured to the elastic pins 15. When the Isofix buckles IF2 are released from the elastic pins 15, the elastic pins 15 may be naturally inserted by an elastic force and kept.

Referring to FIG. 7, a first hole H1 through which the infant securing belt IB passes and a second hole H2 through which the hanger belt FB for being secured to a rear surface of the seat of the vehicle passes may be formed in an upper surface of the aluminum frame 11. An end portion of the infant securing belt IB and an end portion of the hanger belt FB may pass through the first hole H1 and the second hole H2, respectively, to be fixed to the aluminum frame 11. A protecting portion (no reference sign provided) formed of silicon or the like may be provided on at least a portion of the periphery of the first hole H1 and the second hole H2 so as to prevent damage to the belts inserting into the holes.

In addition, a back cover 16 may be provided at the rear surface of the aluminum frame 11 to define a receiving space in which the hanger belt FB is received. The hanger belt FB may hang on a latch provided at the rear surface of the seat of the vehicle to cause the portable car seat 1 to adhere to the seat of the vehicle.

Referring to FIGS. 8 and 9, the headrest part 30 may include a head support HF, a wire 31 and a headrest cover 32. The head support HF may be inserted into the aluminum frame 11. The wire 31 which is curved may extend from a top end of the head support HF toward the left and right and the front, extend downwards to a predetermined height, and extend toward the center and the back. The headrest cover 32 may have a mesh structure to cover the wire 31. A cover loop 33 of the headrest cover 32 may be caught by an end portion of the head support HF. The wire 31 may be an aluminum pipe and the headrest cover 32 may be in the form of mesh combined with foam.

The height adjustment part 40 may be configured to adjust the height of the headrest part 30 by lifting or lowering the headrest part 30 with respect to the backrest part 10. The push portion 41 may be provided at the rear side of the height adjustment part 40 for the lifting and lowering operations of the headrest part 30. As described above, the end portion of the push portion 41 may protrude upwards, so that the fixation loop 23 may be hooked on the protruding end portion of the push portion 41 when the seat part 20 is folded.

According to another embodiment, the head support HF may include a pair of parallel bars instead of a single bar, and the push portion 41 may be provided at the side of the height adjustment part 40 instead of the rear thereof.

Referring to FIGS. 10 and 11, according to an embodiment of the present disclosure, the portable car seat 1 may include a hook portion HK which is hooked on the lower end of the backrest part 10 when the seat part 20 is placed in front of the backrest part 10. After the seat part 20 switches from the storage position to the use position, the hook portion HK of the seat part 20 may be caught by the frame of the backrest part 10 to prevent the seat part 20 in the use position from being arbitrarily rotated to the storage position.

More specifically, one end of the hook portion HK may be rotatably coupled to the seat part 20 and the other end of the hook portion HK may be caught by a stopper 521 which is provided in a width direction on the lower end of the backrest part 10. The frame structure of the portable car seat 1 will be described below in detail.

Referring to FIGS. 12 and 13, according to an embodiment of the present disclosure, the portable car seat 1 may include a rotation part 50 which rotatably connects the seat part 20 and the backrest part 10 to each other. The rotation part 50 may switch between a portable state in which the seat part 20 rotates around the backrest part 10 to face the rear surface of the backrest part 10 and a seatable state in which the seat part 20 is inclined with respect to the front surface of the backrest part 10 to turn into a chair. The rotation part 50 may include a rotation connection part 51 and a rotation prevention part 52.

The rotation connection part 51 may rotatably connect the backrest part 10 and the seat part 20 to each other. More specifically, the rotation connection part 51 may include a rotation frame 512 and a rotation coupling unit 511. The rotation frame 512 may be fixed in a width direction to a lower end of the aluminum frame 11. The rotation coupling unit 511 may be rotatably provided on the rotation frame 512 and connected to an end portion of the seat frame 21 of the seat part 20.

The rotation frame 512 may serve as a rotary shaft around which the backrest part 10 and the seat part 20 rotate. In addition, a rotation origin P1 may be formed at the rotation frame 512 at a position where and the rotation frame 512 is connected to the aluminum frame 11, so that the backrest part and the seat part 20 may rotate in a clockwise or counterclockwise direction.

Referring to FIG. 13A, when the portable car seat 1 is arranged on the seat of the vehicle to seat an infant in the vehicle, the backrest part 10 and the seat part 20 may be connected perpendicularly to each other to turn into a chair on which the infant sits.

When the portable car seat 1 is removed from the seat of the vehicle and carried around, the rotational momentum generated by exerting a force to a seat part supporting point P3 of the seat part 20 may cause the seat part 20 to rotate around the rotation origin P1 as a rotary axis as much as possible in a counterclockwise direction. As a result, as shown in FIG. 13B, the seat part 20 may be arranged to face the rear surface of the backrest part 10.

As described above, according to an embodiment of the present disclosure, the backrest part 10 and the seat part 20 of the portable car seat 1 may be configured as a collapsible assembly by the rotation connection part 51 to thereby improve portability.

The rotation prevention part 52 may restrict relative rotation of the backrest part 10 and the seat part 20 by the rotation connection part 51. More specifically, the rotation prevention part 52 may include the stopper 521 fixed to the lower end of the aluminum frame 11 in a width direction and a stopper facing part 522 fixed in the width direction at a position facing the stopper 521 when the seat part 20 rotates.

When the seat part 20 rotates clockwise, the stopper 521 may meet the stopper facing part 522 to restrict the rotation of the seat part 20. Preferably, the stopper 521 may restrict rotations in a direction in which a space where the infant sits is folded.

In the portable car seat 1 according to an embodiment of the present disclosure, a rotation preventing point P2 which directly contacts the seat of the vehicle may be provided on the aluminum frame 11 to effectively prevent, together with the rotation prevention part 52, the rotation of the seat part 20 folded in the direction of the space where the infant sits.

The rotation preventing point P2 may be separated in a forward direction from the rotation origin P1, which is formed on the lower end of the aluminum frame 11, at a predetermined interval to restrict the rotation of the backrest part 10 folded in the direction of the space where the infant sits.

The stopper 521 may be located above the rotation preventing point P2. After a relative rotary force of the backrest part 10 and the seat part 20 is primarily reduced by the rotation preventing point P2, the stopper 521 may meet the stopper facing part 522 to secondarily attenuate the rotary force of the seat part 20 to thereby completely offset the rotary force of the backrest part 10 and the seat part 20.

Referring to FIG. 13A, the backrest part 10 and the seat part 20 of the portable car seat 1 are arranged perpendicularly to each other. The stopper 521 provided on the aluminum frame 11 of the backrest part 10 may meet the stopper facing part 522 of the seat part 20 to thereby prevent the seat part 20 from being rotated toward the space in the portable car seat 1 where the infant sits. In other words, the rotation prevention part 52 may prevent the seat part 20 from being rotated at an angle of less than 90 degrees in a clockwise direction on the basis of the aluminum frame 11.

Therefore, the rotation prevention part 52 allows the seat part 20 to rotate around the backrest part 10 by 90 to 360 degrees. More specifically, the seat part 20 may rotate in a clockwise or counterclockwise direction on the basis of the aluminum frame 11 at an angle greater than zero degrees and less than 270 degrees.

For example, when an infant sits on the portable car seat 1, wears the infant securing belt TB and leans forward, since the infant securing belt TB secures the infant by the backrest part 10 and the seat part 20, rotational momentum may be generated to cause the backrest part 10 and the seat part 20 to rotate toward the space where the infant sits.

This phenomenon easily occurs at the time of sudden braking or a quick start of a vehicle. When the portable car seat 1 is collapsible, the backrest part 10 and the seat part 20 are automatically folded toward the space where the infant sits when the infant lurches forward. As a result, the safety of infants is significantly threatened.

According to an embodiment of the present disclosure, as described above, the portable car seat 1 may doubly offset the rotational momentum, generated when the seat part 20 leans forward and causing the seat part 20 to be folded toward the space when an infant sits, by primarily attenuating the rotational momentum of the backrest part 10 by the rotation preventing point P2, and secondarily attenuating the rotational momentum of the seat part 20 by making the stopper 521 and the stopper facing part 522 of the rotation prevention part 52 to contact each other. Therefore, the folding of the seat part 20 may be double prevented, so that the safety function of the portable car seat 1 may be remarkably improved.

According to an embodiment of the present disclosure, the portable car seat 1 is collapsible to improve portability to increase a rate of mounting the car seat in the vehicle, so that the safety of an infant may be actually secured.

More specifically, according to an embodiment of the present disclosure, the portable car seat 1 uses the strong and lightweight aluminum frame 11 and facilities attachment and detachment of operating components, so that safety, portability and user convenience may be achieved.

In addition, according to an embodiment of the present disclosure, although the portable car seat 1 is collapsible to increase portability, the portable car seat 1 is dynamically configured to be supported by the seat of the vehicle, so that the rotational momentum of the portable car seat may be offset to remarkably improve the safety function of the portable car seat 1.

In addition to the above-described embodiments, the present invention covers all embodiments including a combination of at least any one of the embodiments and known technology, or a combination of at least two embodiments.

The foregoing description is intended to illustrate and describe the present invention. In addition, the foregoing is merely illustrative and explanatory of preferred embodiments of the present invention, and as described above, the present invention may be used in various other combinations, modifications, and environments. Changes or modifications may be made within the scope of the inventive concepts disclosed herein, within the scope of equivalents to those described and/or within the skill or knowledge of those skilled in the art. Accordingly, the foregoing description of the invention is not intended to limit the invention to the embodiments disclosed. In addition, the appended claims should be construed to include other embodiments.

It will be apparent to those skilled in the art that various modifications can be made to the above-described exemplary embodiments of the present invention without departing from the spirit or scope of the invention. Thus, it is intended that the present invention cover all such modifications provided they come within the scope of the appended claims and their equivalents.

What is claimed is:

1. A portable car seat comprising:
a backrest part;
a seat part rotating to be positioned at a front side or a rear side of the backrest part, wherein the backrest part includes a metal frame, and the seat part switches between a portable state in which the seat part is disposed to face a rear surface of the backrest part and a seatable state in which the seat part is inclined with respect to a front surface of the backrest part, and
a fixation loop allowing the seat part to hang on an upper end of the backrest part when the seat part is folded upon the rear side of the backrest part to be in the portable state.

2. The portable car seat of claim 1, further comprising:
a headrest part provided above the backrest part; and
a height adjustment part lifting or lowering the headrest part with respect to the backrest part,
wherein the fixation loop is caught on a push portion of the height adjustment part lifting and lowering the headrest part.

3. A portable car seat comprising:
a backrest part;
a seat part rotating to be positioned at a front side or a rear side of the backrest part, wherein the backrest part includes a metal frame,
a hook portion hooked on a lower end of the backrest part when the seat part is placed at the front side of the backrest part,
wherein one end of the hook portion is rotatably coupled to the seat part and another end of the hook portion is caught by a stopper provided in a width direction on the lower end of the backrest part.

4. The portable car seat of claim 3, further comprising a rotation part rotatably connecting the seat part to the backrest part.

5. The portable car seat of claim 4, wherein the rotation part rotates about the backrest part and switches between a portable state in which the seat part is disposed to face a rear surface of the backrest part and a seatable state in which the seat part is inclined with respect to a front surface of the backrest part.

6. The portable car seat of claim 5, wherein the backrest part comprises a reinforced frame provided in a width direction on the metal frame.

7. The portable car seat of claim 3, wherein the seat part further comprises:
a seat frame; and
a seat cover enclosing the seat frame.

8. The portable car seat of claim 4, wherein the rotation part comprises:
- a rotation connection part rotating the seat part with respect to the backrest part; and
- a rotation prevention part restricting rotation of the seat part with respect to the backrest part.

9. The portable car seat of claim 8, wherein the rotation connection part comprises:
- a rotation frame provided in the width direction at the lower end of the backrest frame and serving as a rotating shaft of the seat part; and
- a rotation coupling unit rotatably provided on the rotation frame and connected to an end portion of the seat frame.

10. The portable car seat of claim 8, wherein the rotation prevention part comprises:
- a stopper provided in the width direction at the lower end of the backrest frame; and
- a stopper facing part provided in the width direction at a position facing the stopper when the seat part rotates, and preventing rotation of the seat part toward the space in which the infant sits.

11. The portable car seat of claim 3, further comprising an infant securing belt including a shoulder cushion part and a latch buckle and allowing an infant to be indirectly secured to a vehicle.

12. The portable car seat of claim 3, wherein elastic pins are provided on lower ends of both sides of the metal frame so that a portion of Isofix buckles to be fixed to an attachment in a seat of a vehicle rests and is secured on the elastic pins when an Isofix system including the Isofix buckles is not installed on the seat of the vehicle.

* * * * *